(12) United States Patent
Onitsuka

(10) Patent No.: US 11,912,270 B2
(45) Date of Patent: Feb. 27, 2024

(54) VEHICLE DRIVING ASSIST APPARATUS

(71) Applicant: TOYOTA JIDOSHA KABUSHIKI KAISHA, Toyota (JP)

(72) Inventor: Masakatsu Onitsuka, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 249 days.

(21) Appl. No.: 17/487,248

(22) Filed: Sep. 28, 2021

(65) Prior Publication Data

US 2022/0194363 A1   Jun. 23, 2022

(30) Foreign Application Priority Data

Dec. 17, 2020  (JP) .................................. 2020-208999

(51) Int. Cl.
*B60W 30/09* (2012.01)
*B60W 10/04* (2006.01)
*B60W 10/18* (2012.01)

(52) U.S. Cl.
CPC ............ *B60W 30/09* (2013.01); *B60W 10/04* (2013.01); *B60W 10/18* (2013.01); *B60W 2520/10* (2013.01); *B60W 2520/12* (2013.01); *B60W 2540/229* (2020.02); *B60W 2710/182* (2013.01); *B60W 2720/10* (2013.01); *B60W 2720/12* (2013.01)

(58) Field of Classification Search
CPC ....................... B60W 60/0051; B60W 2556/65
See application file for complete search history.

(56) References Cited

U.S. PATENT DOCUMENTS

| | | | | |
|---|---|---|---|---|
| 5,407,228 A | * | 4/1995 | Shibata | ............... B60R 21/0133 |
| | | | | 180/282 |
| 10,997,800 B1 | * | 5/2021 | Salodkar | .............. G07C 5/0808 |
| 2004/0193347 A1 | * | 9/2004 | Harumoto | ................ G08G 1/16 |
| | | | | 701/45 |

(Continued)

FOREIGN PATENT DOCUMENTS

| | | | | | |
|---|---|---|---|---|---|
| CN | 106740630 A | * | 5/2017 | ......... | B60R 21/0132 |
| EP | 3158392 B1 | * | 3/2020 | ............. | B60K 35/00 |

(Continued)

*Primary Examiner* — Jelani A Smith
*Assistant Examiner* — Nada Mahyoob Alqaderi
(74) *Attorney, Agent, or Firm* — Dickinson Wright, PLLC

(57) ABSTRACT

A vehicle driving assist apparatus acquires a collision index value which represents a magnitude of a collision of an own vehicle and a dozing level of a driver of the own vehicle, and executes a secondary collision reducing control of executing a forcibly-decelerating process of forcibly decelerating the own vehicle when a light collision condition is satisfied, and a dozing condition is satisfied. The vehicle driving assist apparatus executes the forcibly-decelerating process so as to decelerate the own vehicle with controlling a deceleration of the own vehicle such that the deceleration of the vehicle realized when the light collision condition and the dozing condition become satisfied, and the dozing level is relatively low, is smaller than the deceleration of the own vehicle realized when the deceleration when the light collision condition and the dozing condition become satisfied, and the dozing level is relatively high.

7 Claims, 7 Drawing Sheets

(56) References Cited

U.S. PATENT DOCUMENTS

| | | | | |
|---|---|---|---|---|
| 2012/0209488 A1* | 8/2012 | Nagaya | ................ | B60W 10/06 |
| | | | | 701/70 |
| 2015/0360655 A1* | 12/2015 | Odate | ................... | B60W 10/18 |
| | | | | 701/70 |
| 2018/0170375 A1* | 6/2018 | Jang | ..................... | G06V 20/597 |
| 2019/0039624 A1* | 2/2019 | Ike | ...................... | B60W 50/14 |
| 2019/0337533 A1* | 11/2019 | Kume | .................. | B60W 50/14 |
| 2020/0269867 A1* | 8/2020 | Hua | ..................... | B60W 30/09 |
| 2020/0279879 A1* | 9/2020 | Ebiko | .................... | G01S 17/88 |
| 2020/0342756 A1* | 10/2020 | MacKenzie | .............. | G08G 1/16 |
| 2021/0086763 A1* | 3/2021 | Albinsson | ............. | B60W 10/04 |
| 2022/0153304 A1* | 5/2022 | Kanzler | ............. | B60W 30/095 |

FOREIGN PATENT DOCUMENTS

| | | | | |
|---|---|---|---|---|
| JP | 2016002868 | A | * | 1/2016 |
| JP | 2016002868 | A | | 1/2016 |

\* cited by examiner

|  | FIRST VEHICLE MOVING SPEED RANGE | | SECOND VEHICLE MOVING SPEED RANGE | | THIRD VEHICLE MOVING SPEED RANGE | |
|---|---|---|---|---|---|---|
|  | DRIVING FORCE | BRAKING FORCE | DRIVING FORCE | BRAKING FORCE | DRIVING FORCE | BRAKING FORCE |
| THIRD LEVEL | ZERO | SEVENTH BRAKING FORCE (REQUESTED BRAKING FORCE) | ZERO | EIGHTH BRAKING FORCE (REQUESTED BRAKING FORCE) | ZERO | NINTH BRAKING FORCE (REQUESTED BRAKING FORCE) |
| SECOND LEVEL | ZERO | FOURTH BRAKING FORCE (REQUESTED BRAKING FORCE) | ZERO | FIFTH BRAKING FORCE (REQUESTED BRAKING FORCE) | ZERO | SIXTH BRAKING FORCE (REQUESTED BRAKING FORCE) |
| FIRST LEVEL | SMALLER THAN OR EQUAL TO PREDETERMINED DRIVING FORCE | FIRST BRAKING FORCE (=0) (REQUESTED BRAKING FORCE) | ZERO | SECOND BRAKING FORCE (REQUESTED BRAKING FORCE) | ZERO | THIRD BRAKING FORCE (REQUESTED BRAKING FORCE) |

FIG.3

VEHICLE DRIVING ASSIST APPARATUS

BACKGROUND

Field

The invention relates to a vehicle driving assist apparatus.

Description of the Related Art

A collision of an own vehicle which does not lead to developing an airbag occurs (hereinafter, such a collision will be referred to as "light collision"), and then another collision of the own vehicle may occur. There is known a vehicle driving assist apparatus which prevents the other collision (hereinafter, such a collision will be referred to as "secondary collision") after the light collision (JP2016-2868 A). The known vehicle driving assist apparatus prevents the secondary collision by executing a forcibly-decelerating process of forcibly decelerating and stopping the own vehicle at a predetermined deceleration when the light collision occurs.

The driver is dozing, but can awake and take an action for avoiding the secondary collision when the light collision occurs. In this case, if the own vehicle is decelerated by the forcibly decelerating process, a situation that the vehicle is decelerated too much for the driver, may arise. One of measures for avoiding such a situation is to execute the forcibly-decelerating process only when the driver is dozing to an extent that the driver cannot awake even when the light collision arises, in other words, only when it can be considered that the driver is dozing with certainty. One of measure for determining that the driver is dozing with certainty is to determine that the driver is dozing with certainty when a condition that the driver is determined to be dozing continues for a certain time.

However, with this measure, the forcibly-decelerating process is not started to be executed until it is determined that the driver is dozing with certainty. As a result, the secondary collision may not be avoided.

As described above, if the forcibly-decelerating process is executed only when the driver is dozing with certainty, the secondary collision may not be avoided. However, if the forcibly-decelerating process is executed also when the driver is dozing with low certainty, the own vehicle may be unnecessarily decelerated.

SUMMARY

An object of the invention is to provide a vehicle driving assist apparatus which can avoid the secondary collision with certainty with avoiding unnecessary deceleration of the own vehicle.

A vehicle driving assist apparatus according to the invention comprises an electronic control unit. The electronic control unit is configured to acquire (i) a collision index value which represents a magnitude of a collision of an own vehicle and (ii) a dozing level of a driver of the own vehicle. Further, the electronic control unit is configured to execute a secondary collision reducing control of executing a forcibly-decelerating process of forcibly decelerating the own vehicle when (i) a light collision condition that a light collision that the collision index value is within a predetermined light collision range occurs, is satisfied, and (ii) a dozing condition that the dozing level is higher than or equal to a predetermined threshold level, is satisfied.

The electronic control unit is configured to execute the forcibly-decelerating process so as to decelerate the own vehicle with controlling a deceleration of the own vehicle such that the deceleration of the vehicle realized when (i) the light collision condition and the dozing condition become satisfied, and (ii) the dozing level is relatively low, is smaller than the deceleration of the own vehicle realized when the deceleration when (i) the light collision condition and the dozing condition become satisfied, and (ii) the dozing level is relatively high.

Just after the light collision of the own vehicle occurs due to the dozing driver of the own vehicle, another collision (a secondary collision) of the own vehicle may occur. One of measures for avoiding the secondary collision is to execute the forcibly-decelerating process of forcibly decelerating and stopping the own vehicle when the own vehicle has the light collision due to the dozing driver of the own vehicle. In this regard, the driver is dozing, but can awake and take an action for avoiding the secondary collision when the light collision occurs. In this case, if the own vehicle is decelerated by the forcibly decelerating process, a situation that the vehicle is decelerated too much for the driver, may arise. One of measures for avoiding such a situation is to execute the forcibly-decelerating process only when the driver is dozing to an extent that the driver cannot awake even when the light collision arises, in other words, only when it can be considered that the driver is dozing with certainty. One of measure for determining that the driver is dozing with certainty is to determine that the driver is dozing with certainty when a condition that the driver is determined to be dozing continues for a certain time. However, with this measure, the forcibly-decelerating process is not started to be executed until it is determined that the driver is dozing with certainty. As a result, the secondary collision may not be avoided.

As described above, if the forcibly-decelerating process is executed only when the driver is dozing with certainty, the secondary collision may not be avoided. However, if the forcibly-decelerating process is executed also when the driver is dozing with low certainty, the own vehicle may be unnecessarily decelerated.

The vehicle driving assist apparatus according to the invention starts to execute the forcibly-decelerating process when the dozing level of the driver is low and then increases the deceleration of the own vehicle realized by the forcibly-decelerating process when the dozing level of the driver becomes high. Thus, the vehicle driving assist apparatus according to the invention can ensure that the secondary collision is avoided with avoiding the unnecessary deceleration of the own vehicle.

According to an aspect of the invention, the electronic control unit may be configured to execute the forcibly-decelerating process by a forcibly-braking process of applying a braking force greater than or equal to a predetermined braking force to the own vehicle or by a driving force limiting process of limiting a driving force applied to the own vehicle to a value smaller than or equal to a predetermined driving force.

In general, the deceleration of the own vehicle realized by the forcibly-braking process and the deceleration of the own vehicle realized by the driving force limiting process, are different from each other. The vehicle driving assist apparatus according to this aspect of the invention selects suitable one of the forcibly-braking process and the driving force limiting process, depending on which of the forcibly-braking process and the driving force limiting process is suitable to decelerate the own vehicle for avoiding the secondary collision. Thus, the vehicle driving assist apparatus according to this aspect can suitably decelerate the own vehicle to avoid the secondary collision.

According to another aspect of the invention, the electronic control unit may be configured to execute the forcibly-decelerating process by the forcibly-braking process when (i) the light collision condition and the dozing condition become satisfied, and (ii) the dozing level is higher than or equal to a predetermined switching level which is higher than the predetermined threshold level. Further, the electronic control unit may be configured to execute the forcibly-decelerating process by the driving force limiting process when (i) the light collision condition and the dozing condition become satisfied, and (ii) the dozing level is lower than the predetermined switching level.

Preferably, in order to avoid the secondary collision, when the dozing level is high, the own vehicle is decelerated at the deceleration greater than the deceleration at which the own vehicle is decelerated when the dozing level is low. In addition, the forcibly-braking process can generally decelerate the own vehicle at the deceleration greater than the deceleration realized by the driving force limiting process. The vehicle driving assist apparatus according to this aspect of the invention decelerates the own vehicle by the forcibly-braking process when the dozing level is high and decelerates the own vehicle by the driving force limiting process when the dozing level is low. Thus, the vehicle driving assist apparatus according to this aspect can surely avoid the secondary collision.

According to further another aspect of the invention, the electronic control unit may be configured to execute the forcibly-decelerating process by the forcibly-braking process when (i) the light collision condition and the dozing condition become satisfied, and (ii) a vehicle moving speed of the own vehicle is higher than or equal to a predetermined vehicle moving speed. Further, the electronic control unit may be configured to execute the forcibly-decelerating process by the driving force limiting process when (i) the light collision condition and the dozing condition become satisfied, and (ii) the vehicle moving speed of the own vehicle is lower than the predetermined vehicle moving speed.

Preferably, in order to avoid the secondary collision, when the vehicle moving speed of the own vehicle is high, the own vehicle is decelerated at the deceleration greater than the deceleration at which the own vehicle is decelerated when the vehicle moving speed of the own vehicle is low. In addition, the forcibly-braking process can generally decelerate the own vehicle at the deceleration greater than the deceleration realized by the driving force limiting process. The vehicle driving assist apparatus according to this aspect of the invention decelerates the own vehicle by the forcibly-braking process when the vehicle moving speed of the own vehicle is high and decelerates the own vehicle by the driving force limiting process when the vehicle moving speed of the own vehicle is low. Thus, the vehicle driving assist apparatus according to this aspect can surely avoid the secondary collision.

According to further another aspect of the invention, the electronic control unit may be configured to set a predetermined braking force such that the predetermined braking force set when (i) the electronic control unit executes the forcibly-decelerating process by the forcibly-braking process of applying the braking force greater than or equal to the predetermined braking force to the own vehicle in response to the light collision condition and the dozing condition becoming satisfied, and (ii) the dozing level is relatively high, is greater than the predetermined braking force set when (i) the electronic control unit executes the forcibly-decelerating process by the forcibly-braking process of applying the braking force greater than or equal to the predetermined braking force to the own vehicle in response to the light collision condition and the dozing condition becoming satisfied, and (ii) the dozing level is relatively low. Further, the electronic control unit may be configured to set a predetermined driving force such that the predetermined driving force set when (i) the electronic control unit executes the forcibly-decelerating process by the driving force limiting process of limiting the driving force applied to the own vehicle to a value smaller than or equal to the predetermined driving force in response to the light collision condition and the dozing condition becoming satisfied, and (ii) the dozing level is relatively high, is smaller than the predetermined driving force set when (i) the electronic control unit executes the forcibly-decelerating process by the driving force limiting process of applying the driving force applied to the own vehicle to a value smaller than or equal to the predetermined driving force in response to the light collision condition and the dozing condition becoming satisfied, and (ii) the dozing level is relatively low.

Preferably, in order to avoid the secondary collision, when the dozing level is high, the own vehicle is decelerated at the deceleration greater than the deceleration at which the own vehicle is decelerated when the dozing level is low. The vehicle driving assist apparatus according to this aspect of the invention decelerates the own vehicle by the forcibly-decelerating process such that the deceleration realized when the dozing level is high, is greater than the deceleration realized when the dozing level is low. Thus, the vehicle driving assist apparatus according to this aspect can surely avoid the secondary collision.

According to further another aspect of the invention, the electronic control unit may be configured to set a predetermined braking force such that the predetermined braking force set when (i) the electronic control unit executes the forcibly-decelerating process by the forcibly-braking process of applying the braking force greater than or equal to the predetermined braking force to the own vehicle in response to the light collision condition and the dozing condition becoming satisfied, and (ii) a vehicle moving speed of the own vehicle is relatively high, is greater than the predetermined braking force set when (i) the electronic control unit executes the forcibly-decelerating process by the forcibly-braking process of applying the braking force greater than or equal to the predetermined braking force to the own vehicle in response to the light collision condition and the dozing condition becoming satisfied, and (ii) the vehicle moving speed of the own vehicle is relatively low. Further, the electronic control unit may be configured to set a predetermined driving force such that the predetermined driving force set when (i) the electronic control unit executes the forcibly-decelerating process by the driving force limiting process of limiting the driving force applied to the own vehicle to a value smaller than or equal to the predetermined driving force in response to the light collision condition and the dozing condition becoming satisfied, and (ii) the vehicle moving speed of the own vehicle is relatively high, is smaller than the predetermined driving force set when (i) the electronic control unit executes the forcibly-decelerating process by the driving force limiting process of applying the driving force applied to the own vehicle to a value smaller than or equal to the predetermined driving force in response to the light collision condition and the dozing condition becoming satisfied, and (ii) the vehicle moving speed of the own vehicle is relatively low.

Preferably, in order to avoid the secondary collision, when the vehicle moving speed of the own vehicle is high, the own vehicle is decelerated at the deceleration greater than the deceleration at which the own vehicle is decelerated when the vehicle moving speed of the own vehicle is low. The vehicle driving assist apparatus according to this aspect of the invention decelerates the own vehicle by the forcibly-decelerating process such that the deceleration when the vehicle moving speed of the own vehicle is high, is greater than the deceleration when the vehicle moving speed of the own vehicle is low. Thus, the vehicle driving assist apparatus according to this aspect can surely avoid the secondary collision.

According to further another aspect of the invention, the electronic control unit may be configured to acquire a duration time which the electronic control unit has determined that eyes of the driver of the own vehicle are closed. Further, the electronic control unit may be configured to determine that the dozing level when the duration time is relatively long, is higher than the dozing level when the duration time is relatively short.

When the driver has closed his/her eyes for a long time, the driver is probably dozing. The vehicle driving assist apparatus according to this aspect of the invention determines that the dozing level when the duration time is relatively long, is higher than the dozing level when the duration time is relatively short. Thus, the vehicle driving assist apparatus according to this aspect can accurately determine the dozing level of the driver.

According to further aspect of the invention, the predetermined light collision range may be set to a range smaller than the collision index value at which an airbag of the own vehicle is developed.

When the collision of the own vehicle which develops the airbag occurs, the forcibly-decelerating process does not need to be executed. The vehicle driving assist apparatus according to this aspect of the invention executes the forcibly-decelerating process when the collision of the own vehicle which does not develop the airbag (i.e., the light collision) occurs. Thus, the vehicle driving assist apparatus does not execute the forcibly-decelerating process when the forcibly-decelerating process does not need to be executed.

According to further another aspect of the invention, the electronic control unit may be configured to terminate executing the secondary collision reducing control when a control terminating condition becomes satisfied after the light collision condition and the dozing condition become satisfied. Further, the control terminating condition may be satisfied when the dozing level becomes lower than the predetermined threshold level, or when the driver of the own vehicle has made an operation to accelerate or decelerate or steer the own vehicle for a predetermined operating time or more, or when the own vehicle stops.

When the dozing level becomes low, or when the driver of the own vehicle has made the operation to accelerate or decelerate or steer the own vehicle, the forcibly-decelerating process does not need to be continued any more. In addition, when the own vehicle stops, the forcibly-decelerating process does not need to be continued any more. The vehicle driving assist apparatus according to this aspect of the invention terminates executing the forcibly-decelerating process when the dozing level becomes low, or when the driver of the own vehicle has made the operation to accelerate or decelerate or steer the own vehicle, or when the own vehicle stops. Thus, the vehicle driving assist apparatus does not execute the forcibly-decelerating process beyond necessity.

Elements of the invention are not limited to elements of embodiments and modified examples of the invention described along with the drawings. The other objects, features and accompanied advantages of the invention can be easily understood from the embodiments and the modified examples of the invention.

BRIEF DESCRIPTION OF THE DRAWINGS

FIG. 3 is a view which shows a driving force and a braking force which are set, depending on the dozing level and a vehicle moving speed of the own vehicle by a secondary collision reducing control.

DESCRIPTION OF THE EMBODIMENTS

Figure 1:
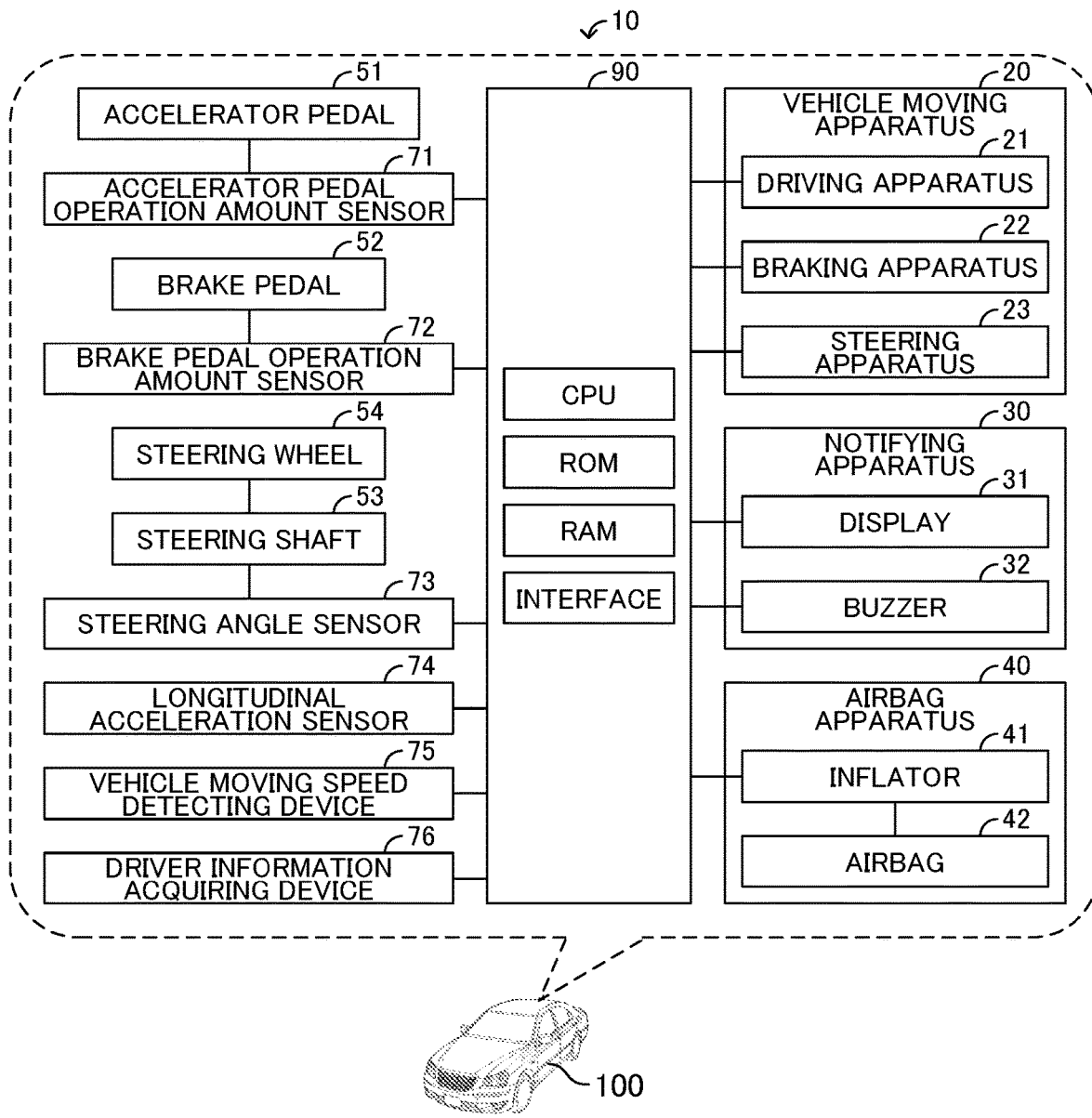
FIG. 1 is a view which shows a vehicle driving assist apparatus according to an embodiment of the invention and an own vehicle on which the vehicle driving assist apparatus according to the embodiment is installed.

Below, a vehicle driving assist apparatus according to an embodiment of the invention will be described with reference to the drawings. As shown in FIG. 1, the vehicle driving assist apparatus 10 according to the embodiment of the invention is installed on an own vehicle 100.

<ECU>

The vehicle driving assist apparatus 10 includes an ECU 90. ECU stands for electronic control unit. The ECU 90 includes a micro-computer as a main component. The micro-computer includes a CPU, a ROM, a RAM, a non-volatile memory, and an interface. The CPU realizes various functions by executing instructions or programs or routines memorized in the ROM.

<Vehicle Moving Apparatus and Etc.>

A vehicle moving apparatus 20, a notifying apparatus 30, and an airbag apparatus 40 are installed on the own vehicle 100. The vehicle moving apparatus 20 is an apparatus which drives, brakes, and steers the own vehicle 100. In this embodiment, the vehicle moving apparatus 20 includes a driving apparatus 21, a braking apparatus, and a steering apparatus 23. The notifying apparatus 30 is an apparatus which notifies a driver of the own vehicle 100. In this embodiment, the notifying apparatus 30 includes a display 31 and a buzzer 32. The airbag apparatus 40 is an apparatus which prevents the driver of the own vehicle 100 from hitting a steering wheel 54 with an airbag developed when a collision of the own vehicle 100 occurs. In this embodiment, the airbag apparatus 40 includes an inflator 41 and an airbag 42.

<Driving Apparatus>

The driving apparatus 21 is an apparatus which outputs a driving force to be applied to the own vehicle 100 to move the own vehicle 100. The driving apparatus 21 is, for example, an internal combustion engine and an electric motor. The driving apparatus 21 is electrically connected to the ECU 90. The ECU 90 can control the driving force output from the driving apparatus 21 by controlling activations of the driving apparatus 21.

<Braking Apparatus>

The braking apparatus 22 is an apparatus which outputs a braking force to be applied to the own vehicle 100 to brake the own vehicle 100. The braking apparatus 22 is, for example, a brake apparatus. The braking apparatus 22 is electrically connected to the ECU 90. The ECU 90 can control the braking force output from the braking apparatus 22 by controlling activations of the braking apparatus 22.

<Steering Apparatus>

The steering apparatus 23 is an apparatus which outputs a steering force to be applied to the own vehicle 100 to steer the own vehicle 100. The steering apparatus 23 is, for example, a power steering apparatus. The steering apparatus 23 is electrically connected to the ECU 90. The ECU 90 can control the steering force output from the steering apparatus 23 by controlling activations of the steering apparatus 23.

As described above, the vehicle driving assist apparatus 10 (in particular, the ECU 90) can drive, brake, and steer the own vehicle 100 by controlling activations of the vehicle moving apparatus 20.

<Display>

The display 31 is a device which displays various images. The display 31 is electrically connected to the ECU 90. The ECU 90 can display various images on the display 31.

<Buzzer>

The buzzer 32 is a device which outputs various alerting sounds. The buzzer 32 is electrically connected to the ECU 90. The ECU 90 can output various alerting sounds from the buzzer 32.

As described above, the vehicle driving assist apparatus 10 (in particular, the ECU 90) can make various notifications to the driver of the own vehicle 100 by activating the notifying apparatus 30.

<Airbag>

The inflator 41 is a device which generates gas used to develop the airbag 42. The inflator 41 is electrically connected to the ECU 90. The ECU 90 activates the inflator 41 to generate the gas when a collision index value C becomes greater than or equal to a predetermined value Cth. The collision index value C has a correlation with a longitudinal deceleration Gd detected by a longitudinal acceleration sensor 74 described later. As the gas flows into the airbag 42, the airbag 42 is developed by the gas.

<Sensors>

An accelerator pedal 51, a brake pedal 52, a steering shaft 53, a steering wheel 54, an accelerator pedal operation amount sensor 71, a brake pedal operation amount sensor 72, a steering angle sensor 73, a longitudinal acceleration sensor 74, a vehicle moving speed detecting device 75, and a driver information acquiring device 76 are installed on the own vehicle 100.

<Accelerator Pedal Operation Amount Sensor>

The accelerator pedal operation amount sensor 71 is a sensor which detects an operation amount of the accelerator pedal 51. The accelerator pedal operation amount sensor 71 is electrically connected to the ECU 90. The accelerator pedal operation amount sensor 71 sends information on the detected operation amount of the accelerator pedal 51 to the ECU 90. The ECU 90 acquires the operation amount of the accelerator pedal 51 as an accelerator pedal operation amount AP, based on the information sent from the accelerator pedal operation amount sensor 71.

The ECU 90 acquires a requested driving force DRreq (or a requested driving torque) by calculation, based on the accelerator pedal operation amount AP and a vehicle moving speed V of the own vehicle 100. The requested driving force DRreq is the driving force which is requested to be output from the driving apparatus 21 by the driver of the own vehicle 100.

<Brake Pedal Operation Amount Sensor>

The brake pedal operation amount sensor 72 is a sensor which detects an operation amount of the brake pedal 52. The brake pedal operation amount sensor 72 is electrically connected to the ECU 90. The brake pedal operation amount sensor 72 sends information on the detected operation amount of the brake pedal 52 to the ECU 90. The ECU 90 acquires the operation amount of the brake pedal 52 as a brake pedal operation amount BP, based on the information sent from the brake pedal operation amount sensor 72.

The ECU 90 acquires a requested braking force BKreq (or a requested braking torque) by calculation, based on the brake pedal operation amount BP. The requested braking force BKreq is the braking force which is requested to be output from the braking apparatus 22 by the driver of the own vehicle 100.

<Steering Angle Sensor>

The steering angle sensor 73 is a sensor which detects a rotation angle of the steering shaft 53 with respect of a neutral position. The driver of the own vehicle 100 can rotate the steering shaft 53 by rotating the steering wheel 54 operably connected to the steering shaft 53. The steering angle sensor 73 is electrically connected to the ECU 90. The steering angle sensor 73 sends information on the detected rotation angle of the steering shaft 53 to the ECU 90. The ECU 90 acquires the rotation angle of the steering shaft 53 as a steering angle $\theta$, based on the information sent from the steering angle sensor 73.

The ECU 90 acquires a requested steering force (or a requested steering torque) by calculation, based on the steering angle $\theta$. The requested steering force is the steering force which is requested to be output from the steering apparatus 23. The ECU 90 controls activations of the steering apparatus 23 to output the steering force which corresponds to the requested steering force.

<Longitudinal Acceleration Sensor>

The longitudinal acceleration sensor 74 is a sensor which detects a longitudinal acceleration of the own vehicle 100. The longitudinal acceleration sensor 74 is electrically connected to the ECU 90. The longitudinal acceleration sensor 74 sends information on the detected longitudinal acceleration of the own vehicle 100 to the ECU 90. The ECU 90 acquires the longitudinal acceleration of the own vehicle 100, based on the information sent from the longitudinal acceleration sensor 74. It should be noted that when the acquired acceleration is negative, the acquired acceleration is a longitudinal deceleration of the own vehicle 100 (in this embodiment, a longitudinal deceleration Gd).

<Vehicle Moving Speed Detecting Device>

The vehicle moving speed detecting device 75 is a sensor which detects a vehicle moving speed of the own vehicle 100. The vehicle moving speed detecting device 75 is, for example, vehicle wheel rotation speed sensors. The vehicle moving speed detecting device 75 is electrically connected to the ECU 90. The vehicle moving speed detecting device 75 sends information on the detected vehicle moving speed of the own vehicle 100 to the ECU 90. The ECU 90 acquires the vehicle moving speed V of the own vehicle 100, based on the information sent from the vehicle moving speed detecting device 75. It should be noted that when the vehicle moving speed V is zero, the ECU 90 determines that the own vehicle 100 stops.

<Driver Information Acquiring Device>

The driver information acquiring device 76 is a device which acquires information on the driver of the own vehicle 100. The driver information acquiring device 76 is, for example, a so-called driver monitor. The driver information acquiring device 76 is electrically connected to the ECU 90. The driver information acquiring device 76 sends the acquired information (in this embodiment, the driver information I_D) to the ECU 90. The ECU 90 can determine whether eyes of the driver of the own vehicle 100 are closed, based on the driver information I_D.

<Summary of Operations of Vehicle Driving Assist Apparatus>

Next, a summary of operations of the vehicle driving assist apparatus 10 will be described. When the vehicle driving assist apparatus 10 determines that the driver of the own vehicle 100 is dozing, the vehicle driving assist apparatus 10 executes a notifying process for the driver of the own vehicle 100. In addition, when a light collision of the own vehicle 100 occurs while the vehicle driving assist apparatus 10 determines that the driver of the own vehicle 100 is dozing, the vehicle driving assist apparatus 10 executes a secondary collision reducing control of automatically decelerating the own vehicle 100.

Below, the notifying process and the secondary collision reducing control will be described.

The vehicle driving assist apparatus 10 acquires a dozing level LV which represents a level of doze of the driver of the own vehicle 100. In this embodiment, the dozing level LV is acquired, based on a duration time T for which the vehicle driving assist apparatus 10 continues determining that the eyes of the driver of the own vehicle 100 are closed. In this embodiment, whether the eyes of the driver of the own vehicle 100 are closed, is determined, based on the driver information I_D. In this embodiment, the vehicle driving assist apparatus 10 determines that the eyes of the driver of the own vehicle 100 are closed when the eyes of the driver are fully closed. In this regard, the vehicle driving assist apparatus 10 may be configured to determine that the eyes of the driver of the own vehicle 100 are closed when an opening degree of the eyes of the driver is smaller than or equal to a predetermined degree. For example, the vehicle driving assist apparatus 10 may be configured to determine that the eyes of the driver of the own vehicle 100 are closed when the opening degree of the eyes of the driver is smaller than or equal to 10 percent. In this case, the opening degree of the eyes of the driver of the own vehicle 100 is 100 percent when the eyes of the driver are fully open.

Figure 2:
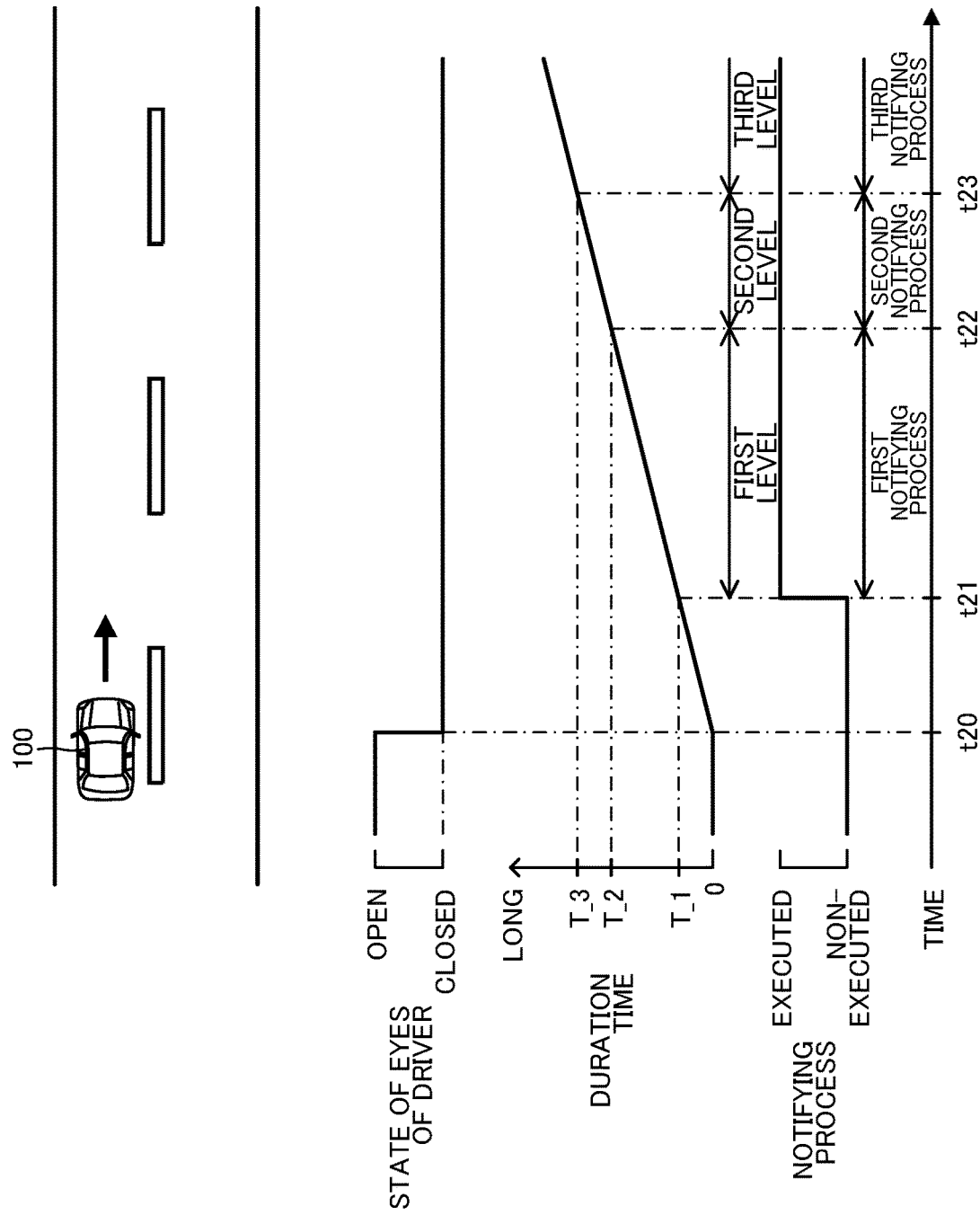
FIG. 2 is a view which shows a time chart of changes of a dozing level and etc. when a notifying process of alerting a driver of the own vehicle is executed.

As shown in FIG. 2, the vehicle driving assist apparatus 10 starts to execute a measuring process of measuring the duration time T elapsed since the vehicle driving assist apparatus 10 determines that the eyes of the driver of the own vehicle 100 are closed (at a time t20).

When the vehicle driving assist apparatus 10 determines that the duration time T reaches a predetermined time (in this embodiment, a first time T_1) (at a time t21), the vehicle driving assist apparatus 10 determines that a dozing condition that the dozing level LV is greater than or equal to a predetermined threshold level LVth, is satisfied. In particular, the vehicle driving assist apparatus 10 determines that the dozing level LV corresponds to a first level LV_1 when the duration time T reaches the first time T_1 (at the time t21). Then, the vehicle driving assist apparatus 10 determines that the dozing level LV corresponds to a second level LV_2 when the duration time T reaches a second time T_2 (at a time t22). Then, the vehicle driving assist apparatus 10 determines that the dozing level LV corresponds to a third level LV_3 when the duration time T reaches a third time T_3 (at a time t23).

In this embodiment, the first time T_1 is set to a value longer than zero. However, the first time T_1 may be set to a value of zero.

<Notifying Process>

The vehicle driving assist apparatus 10 executes the notifying process as a first notifying process of (i) displaying an image on the display 31 as a first image which alerts the driver of the own vehicle 100 and (ii) continuously outputting alerting sounds at a predetermined volume from the buzzer 32 while the dozing level LV corresponds to the first level LV_1 (a period from the time t21 to the time t22 in FIG. 2).

Further, while the dozing level LV corresponds to the second level LV_2 (a period from the time t22 to the time t23 in FIG. 2), the vehicle driving assist apparatus 10 executes the notifying process as a second notifying process of (i) displaying an image on the display 31 as a second image which alerts the driver of the own vehicle 100 and (ii) intermittently outputting alerting sounds at the predetermined volume with a predetermined cycle from the buzzer 32. In this embodiment, the second image is the same image as the first image. However, the second image may be an image different from the first image.

Further, while the dozing level LV corresponds to the third level LV_3 (a period after the time t23 in FIG. 2), the vehicle driving assist apparatus 10 executes the notifying process as a third notifying process of (i) displaying an image on the display 31 as a third image which alerts the driver of the own vehicle 100 and (ii) intermittently outputting alerting sounds at the predetermined volume with the predetermined cycle from the buzzer 32. In this regard, the vehicle driving assist apparatus 10 may be configured to stop (i) displaying the image on the display 31 and (ii) outputting the alerting sound from the buzzer 32 when the dozing level LV reaches the third level LV_3.

The vehicle driving assist apparatus 10 terminates executing the notifying process when a notifying terminating condition becomes satisfied while the vehicle driving assist apparatus 10 is executing the first, or second, or third notifying process. In this embodiment, the notifying terminating condition becomes satisfied when the dozing level LV becomes lower than or equal to a predetermined threshold level LVth. In other words, the notifying terminating condition becomes satisfied when a duration time for which the vehicle driving assist apparatus 10 continues determining that the eyes of the driver of the own vehicle 100 are not closed, i.e., are open, reaches a predetermined time. Further, the notifying terminating condition becomes satisfied when the accelerator pedal 51 has been operated by the driver of the own vehicle 100 to accelerate the own vehicle 100 for a predetermined time (in this embodiment, a predetermined operation time) or more. Furthermore, the notifying terminating condition becomes satisfied when the brake pedal 52 has been operated by the driver of the own vehicle 100 to decelerate the own vehicle 100 for the predetermined operation time or more. Furthermore, the notifying terminating condition becomes satisfied when the steering wheel 54 has been operated by the driver of the own vehicle 100 to steer the own vehicle 100 for the predetermined operation time or more. Furthermore, the notifying terminating condition becomes satisfied when the own vehicle 100 stops.

<Secondary Collision Reducing Control>

Further, the vehicle driving assist apparatus 10 is determining whether a light collision condition is satisfied. In this embodiment, the light collision condition becomes satisfied when (i) the longitudinal deceleration Gd of the own vehicle 100 is within a predetermined longitudinal deceleration range Rgd, and (ii) an integration value YGd of the longitudinal deceleration Gd becomes greater than or equal to a predetermined integration value $\Sigma Gd\_th$. The integration value $\Sigma Gd$ is a value acquired by integrating the longitudinal decelerations Gd while the longitudinal deceleration Gd is within the predetermined longitudinal deceleration range Rgd. In other words, the light collision condition becomes satisfied when the collision index value C which represents the magnitude of the collision of the own vehicle 100 is within a predetermined light collision range Rc. In this embodiment, the predetermined light collision range Rc is set to a range smaller than a range of the collision index value C which develops the airbag 42. Thus, in this embodiment, the vehicle driving assist apparatus 10 uses the longitudinal deceleration Gd of the own vehicle 100 and the integration value $\Sigma Gd$ as the collision index values C which represent the magnitude of the collision of the own vehicle 100.

The vehicle driving assist apparatus 10 determines whether the dozing condition that the dozing level LV is greater than or equal to the predetermined threshold level LVth, is satisfied when the light collision condition becomes satisfied. In particular, the vehicle driving assist apparatus 10 determines which of the first level LV_1, the second level LV_2, and the third level LV_3, the dozing level LV corresponds to.

When the dozing level LV is greater than or equal to the predetermined threshold level LVth, the vehicle driving assist apparatus 10 executes the secondary collision reducing control. In this embodiment, the secondary collision reducing control is a control of executing a forcibly-decelerating process of forcibly decelerating the own vehicle 100. The forcibly-decelerating process includes (i) a driving force limiting process of limiting the driving force DR applied to the own vehicle 100 to a value smaller than or equal to a predetermined driving force DRth and (ii) a forcibly-braking process of applying the braking force BK greater than or equal to a predetermined braking force BKth to the own vehicle 100.

The vehicle driving assist apparatus 10 may be configured to (i) set a target value of the deceleration of the own vehicle 100, depending on the dozing level LV and the vehicle moving speed V when the light collision condition and the dozing condition become satisfied and (ii) sets the predetermined driving force DRth and the predetermined braking force BKth so as to realize the target value of the deceleration. In this embodiment, the predetermined driving force DRth and the predetermined braking force BKth are previously set, depending on the dozing level LV and the vehicle moving speed V as shown in FIG. 3. Thus, the secondary collision reducing control is executed as described below.

<Secondary Collision Reducing Control at First Level>
<First Level and Low Vehicle Moving Speed>

When (i) the light collision condition becomes satisfied, (ii) the dozing level LV at that time corresponds to the first level LV_1, and (iii) the vehicle moving speed V is within a first vehicle moving speed range R_1, the vehicle driving assist apparatus 10 determines whether the requested driving force DRreq is greater than the predetermined driving force DRth, and whether the requested braking force BKreq is greater than a first braking force BK_1.

The first vehicle moving speed range R_1 is a range greater than the first vehicle moving speed V_1 (in this embodiment, zero) and smaller than or equal to a second vehicle moving speed V_2. The second vehicle moving speed V_2 is set to a value greater than the first vehicle moving speed V_1. The predetermined driving force DRth is set to a value greater than zero. In this embodiment, the first braking force BK_1 is set to zero. However, the first braking force BK_1 may be set to a value slightly greater than zero.

The vehicle driving assist apparatus 10 sets the predetermined driving force DRth as a target driving force DRtgt when the requested driving force DRreq is greater than the predetermined driving force DRth. On the other hand, when the requested driving force DRreq is smaller than or equal to the predetermined driving force DRth, the vehicle driving assist apparatus 10 sets the requested driving force DRreq as the target driving force DRtgt. Then, the vehicle driving assist apparatus 10 controls the activations of the vehicle moving apparatus 20 so as to output the driving force which corresponds to the set target driving force DRtgt, from the driving apparatus 21.

Further, when the requested braking force BKreq is greater than the first braking force BK_1 (i.e., zero), the vehicle driving assist apparatus 10 sets the requested braking force BKreq as a target braking force BKtgt, and then controls the activations of the vehicle moving apparatus 20 so as to output the braking force which corresponds to the set target braking force BKtgt, from the braking apparatus 22. On the other hand, when the requested braking force BKreq is smaller than or equal to the first braking force BK_1, i.e., when the requested braking force BKreq is zero, the vehicle driving assist apparatus 10 sets the target braking force BKtgt to zero, and thus controls the activations of the vehicle moving apparatus 20 so as not to output the braking force from the braking apparatus 22.

As described above, the vehicle driving assist apparatus 10 executes the driving force limiting process as the forcibly-decelerating process of limiting the driving force DR applied to the own vehicle 100 to a value smaller than or equal to the predetermined driving force DRth when (i) the light collision condition becomes satisfied, (ii) the dozing level LV at that time corresponds to the first level LV_1, and (iii) the vehicle moving speed V is within the first vehicle moving speed range R_1. In addition, the vehicle driving assist apparatus 10 executes the forcibly-braking process as the forcibly-decelerating process of applying the braking force BK greater than or equal to the predetermined braking force BKth (i.e., zero) to the own vehicle 100 when (i) the light collision condition becomes satisfied, (ii) the dozing level LV at that time corresponds to the first level LV_1, and (iii) the vehicle moving speed V is within the first vehicle moving speed range R_1.

<First Level and Middle Vehicle Moving Speed>

When (i) the light collision condition becomes satisfied, (ii) the dozing level LV at that time corresponds to the first level LV_1, and (iii) the vehicle moving speed V is within a second vehicle moving speed range R_2, the vehicle driving assist apparatus 10 sets the target driving force DRtgt to zero, independently of the accelerator pedal operation amount AP, and controls the activations of the vehicle moving apparatus 20 so as not to output the driving force DR from the driving apparatus 21.

In other words, when (i) the light collision condition becomes satisfied, (ii) the dozing level LV at that time corresponds to the first level LV_1, and (iii) the vehicle moving speed V is within the second vehicle moving speed range R_2, the vehicle driving assist apparatus 10 executes the driving force limiting process as the forcibly-decelerating process of limiting the driving force DR applied to the own vehicle 100 to a value smaller than or equal to the predetermined driving force DRth (i.e., zero).

The second vehicle moving speed range R_2 is a range greater than the second vehicle moving speed V_2 and smaller than or equal to a third vehicle moving speed V_3. The third vehicle moving speed V_3 is set to a value greater than the second vehicle moving speed V_2.

In addition, when (i) the light collision condition becomes satisfied, (ii) the dozing level LV at that time corresponds to the first level LV_1, and (iii) the vehicle moving speed V is within the second vehicle moving speed range R_2, the vehicle driving assist apparatus 10 determines whether the requested braking force BKreq is greater than or equal to a second braking force BK_2.

The second braking force BK_2 is set to a value greater than the first braking force BK_1 (in this embodiment, zero). In this embodiment, the second braking force BK_2 is set to a constant value, independently of the vehicle moving speed V. However, the second braking force BK_2 may be set to a value which increases as the vehicle moving speed V increases.

The vehicle driving assist apparatus 10 sets the requested braking force BKreq as the target braking force BKtgt when the requested braking force BKreq is greater than or equal to the second braking force BK_2. On the other hand, when the requested braking force BKreq is smaller than the second braking force BK_2, the vehicle driving assist apparatus 10 sets the second braking force BK_2 as the target braking force BKtgt. Then, the vehicle driving assist apparatus 10 controls the activations of the vehicle moving apparatus 20 so as to output the braking force which corresponds to the set target braking force BKtgt, from the braking apparatus 22.

As described above, the vehicle driving assist apparatus 10 executes the forcibly-braking process as the forcibly-decelerating process of applying the braking force BK greater than or equal to the predetermined driving force DRth (the second braking force BK_2) to the own vehicle 100 when (i) the light collision condition becomes satisfied, (ii) the dozing level LV at that time corresponds to the first level LV_1, and (iii) the vehicle moving speed V is within the second vehicle moving speed range R_2.

<First Level and High Vehicle Moving Speed>

When (i) the light collision condition becomes satisfied, (ii) the dozing level LV at that time corresponds to the first level LV_1, and (iii) the vehicle moving speed V is within a third vehicle moving speed range R_3, the vehicle driving assist apparatus 10 sets the target driving force DRtgt to zero, independently of the accelerator pedal operation amount AP, and controls the activations of the vehicle moving apparatus 20 so as not to output the driving force DR from the driving apparatus 21.

In other words, when (i) the light collision condition becomes satisfied, (ii) the dozing level LV at that time corresponds to the first level LV_1, and (iii) the vehicle moving speed V is within the third vehicle moving speed range R_3, the vehicle driving assist apparatus 10 executes the driving force limiting process as the forcibly-decelerating process of limiting the driving force DR applied to the own vehicle 100 to a value smaller than or equal to the predetermined driving force DRth (i.e., zero).

The third vehicle moving speed range R_3 is a range greater than the third vehicle moving speed V_3.

In addition, when (i) the light collision condition becomes satisfied, (ii) the dozing level LV at that time corresponds to the first level LV_1, and (iii) the vehicle moving speed V is within the third vehicle moving speed range R_3, the vehicle driving assist apparatus 10 determines whether the requested braking force BKreq is greater than or equal to a third braking force BK_3.

The third braking force BK_3 is set to a value greater than the second braking force BK_2. In this embodiment, the third braking force BK_3 is set to a constant value, independently of the vehicle moving speed V. However, the third braking force BK_3 may be set to a value which increases as the vehicle moving speed V increases.

The vehicle driving assist apparatus 10 sets the requested braking force BKreq as the target braking force BKtgt when the requested braking force BKreq is greater than or equal to the third braking force BK_3. On the other hand, when the requested braking force BKreq is smaller than the third braking force BK_3, the vehicle driving assist apparatus 10 sets the third braking force BK_3 as the target braking force BKtgt. Then, the vehicle driving assist apparatus 10 controls the activations of the vehicle moving apparatus 20 so as to output the braking force which corresponds to the set target braking force BKtgt, from the braking apparatus 22.

As described above, the vehicle driving assist apparatus 10 executes the forcibly-braking process as the forcibly-decelerating process of applying the braking force BK greater than or equal to the predetermined driving force DRth (the third braking force BK_3) to the own vehicle 100 when (i) the light collision condition becomes satisfied, (ii) the dozing level LV at that time corresponds to the first level LV_1, and (iii) the vehicle moving speed V is within the third vehicle moving speed range R_3.

<Secondary Collision Reducing Control at Second Level>

<Second Leve and Low Vehicle Moving Speed>

When (i) the light collision condition becomes satisfied, (ii) the dozing level LV at that time corresponds to the second level LV_2, and (iii) the vehicle moving speed V is within a fourth vehicle moving speed range R_4, or when (i) the vehicle driving assist apparatus 10 determines that the dozing level LV corresponds to the second level LV_2 in response to the duration time T reaching the second time T_2, and (ii) the vehicle moving speed V is within the fourth vehicle moving speed range R_4, the vehicle driving assist apparatus 10 sets the target driving force DRtgt to zero, independently of the accelerator pedal operation amount AP, and controls the activations of the vehicle moving apparatus 20 so as not to output the driving force DR from the driving apparatus 21.

In other words, when (i) the light collision condition becomes satisfied, (ii) the dozing level LV at that time corresponds to the second level LV_2, and (iii) the vehicle moving speed V is within the fourth vehicle moving speed range R_4, the vehicle driving assist apparatus 10 executes the driving force limiting process as the forcibly-decelerating process of limiting the driving force DR applied to the own vehicle 100 to a value smaller than or equal to the predetermined driving force DRth (i.e., zero).

The fourth vehicle moving speed range R_4 is a range greater than the fourth vehicle moving speed V_4 (in this embodiment, zero) and smaller than or equal to a fifth vehicle moving speed V_5. The fifth vehicle moving speed V_5 is set to a value greater than the fourth vehicle moving speed V_4. In this embodiment, the fourth vehicle moving speed V_4 is set to the same value as the first vehicle moving speed V_1. However, the fourth vehicle moving speed V_4 may be set to a value different from the first vehicle moving speed V_1. Further, In this embodiment, the fifth vehicle moving speed V_5 is set to the same value as the second vehicle moving speed V_2. However, the fifth vehicle moving speed V_5 may be set to a value different from the second vehicle moving speed V_2.

In addition, when (i) the light collision condition becomes satisfied, (ii) the dozing level LV at that time corresponds to the second level LV_2, and (iii) the vehicle moving speed V is within the fourth vehicle moving speed range R_4, the vehicle driving assist apparatus 10 determines whether the requested braking force BKreq is greater than or equal to a fourth braking force BK_4.

The fourth braking force BK_4 is set to a value greater than zero. In this embodiment, the fourth braking force BK_4 is set to the same value as the second braking force BK_2. However, the fourth braking force BK_4 may be set to a value different from the second braking force BK_2. In this embodiment, the fourth braking force BK_4 is set to a constant value, independently of the vehicle moving speed V. However, the fourth braking force BK_4 may be set to a value which increases as the vehicle moving speed V increases.

The vehicle driving assist apparatus 10 sets the requested braking force BKreq as the target braking force BKtgt when the requested braking force BKreq is greater than or equal to the fourth braking force BK_4. On the other hand, when the requested braking force BKreq is smaller than the fourth braking force BK_4, the vehicle driving assist apparatus 10 sets the fourth braking force BK_4 as the target braking force BKtgt. Then, the vehicle driving assist apparatus 10 controls the activations of the vehicle moving apparatus 20 so as to output the braking force which corresponds to the set target braking force BKtgt, from the braking apparatus 22.

As described above, the vehicle driving assist apparatus 10 executes the forcibly-braking process as the forcibly-decelerating process of applying the braking force BK greater than or equal to the predetermined driving force DRth (the fourth braking force BK_4) to the own vehicle 100 when (i) the light collision condition becomes satisfied, (ii) the dozing level LV at that time corresponds to the second level LV_2, and (iii) the vehicle moving speed V is within the fourth vehicle moving speed range R_4.

<Second Level and Middle Vehicle Moving Speed>

When (i) the light collision condition becomes satisfied, (ii) the dozing level LV at that time corresponds to the second level LV_2, and (iii) the vehicle moving speed V is within a fifth vehicle moving speed range R_5, the vehicle driving assist apparatus 10 sets the target driving force DRtgt to zero, independently of the accelerator pedal operation amount AP, and controls the activations of the vehicle moving apparatus 20 so as not to output the driving force DR from the driving apparatus 21.

In other words, when (i) the light collision condition becomes satisfied, (ii) the dozing level LV at that time corresponds to the second level LV_2, and (iii) the vehicle moving speed V is within the fifth vehicle moving speed range R_5, the vehicle driving assist apparatus 10 executes the driving force limiting process as the forcibly-decelerating process of limiting the driving force DR applied to the own vehicle 100 to a value smaller than or equal to the predetermined driving force DRth (i.e., zero).

The fifth vehicle moving speed range R_5 is a range greater than the fifth vehicle moving speed V_5 and smaller than or equal to a sixth vehicle moving speed V_6. The sixth vehicle moving speed V_6 is set to a value greater than the fifth vehicle moving speed V_5.

In addition, when (i) the light collision condition becomes satisfied, (ii) the dozing level LV at that time corresponds to the second level LV_2, and (iii) the vehicle moving speed V is within the fifth vehicle moving speed range R_5. the vehicle driving assist apparatus 10 determines whether the requested braking force BKreq is greater than or equal to a fifth braking force BK_5.

The fifth braking force BK_5 is set to a value greater than the fourth braking force BK_4. In this embodiment, the fifth braking force BK_5 is set to a constant value, independently of the vehicle moving speed V. However, the fifth braking force BK_5 may be set to a value which increases as the vehicle moving speed V increases.

The vehicle driving assist apparatus 10 sets the requested braking force BKreq as the target braking force BKtgt when the requested braking force BKreq is greater than or equal to the fifth braking force BK_5. On the other hand, when the requested braking force BKreq is smaller than the fifth braking force BK_5, the vehicle driving assist apparatus 10 sets the fifth braking force BK_5 as the target braking force BKtgt. Then, the vehicle driving assist apparatus 10 controls the activations of the vehicle moving apparatus 20 so as to output the braking force which corresponds to the set target braking force BKtgt, from the braking apparatus 22.

As described above, the vehicle driving assist apparatus 10 executes the forcibly-braking process as the forcibly-decelerating process of applying the braking force BK greater than or equal to the predetermined driving force DRth (the fifth braking force BK_5) to the own vehicle 100 when (i) the light collision condition becomes satisfied, (ii) the dozing level LV at that time corresponds to the second level LV_2, and (iii) the vehicle moving speed V is within the fifth vehicle moving speed range R_5.

<Second Level and High Vehicle Moving Speed>

When (i) the light collision condition becomes satisfied, (ii) the dozing level LV at that time corresponds to the second level LV_2, and (iii) the vehicle moving speed V is within a sixth vehicle moving speed range R_6, the vehicle driving assist apparatus 10 sets the target driving force DRtgt to zero, independently of the accelerator pedal operation amount AP, and controls the activations of the vehicle moving apparatus 20 so as not to output the driving force DR from the driving apparatus 21.

In other words, when (i) the light collision condition becomes satisfied, (ii) the dozing level LV at that time corresponds to the second level LV_2, and (iii) the vehicle moving speed V is within the sixth vehicle moving speed range R_6, the vehicle driving assist apparatus 10 executes the driving force limiting process as the forcibly-decelerating process of limiting the driving force DR applied to the own vehicle 100 to a value smaller than or equal to the predetermined driving force DRth (i.e., zero).

The sixth vehicle moving speed range R_6 is a range greater than the sixth vehicle moving speed V_6.

In addition, when (i) the light collision condition becomes satisfied, (ii) the dozing level LV at that time corresponds to the second level LV_2, and (iii) the vehicle moving speed V is within the sixth vehicle moving speed range R_6, the vehicle driving assist apparatus 10 determines whether the requested braking force BKreq is greater than or equal to a sixth braking force BK_6.

The sixth braking force BK_6 is set to a value greater than the fifth braking force BK_5. In this embodiment, the sixth braking force BK_6 is set to a constant value, independently of the vehicle moving speed V. However, the sixth braking force BK_6 may be set to a value which increases as the vehicle moving speed V increases.

The vehicle driving assist apparatus 10 sets the requested braking force BKreq as the target braking force BKtgt when the requested braking force BKreq is greater than or equal to the sixth braking force BK_6. On the other hand, when the requested braking force BKreq is smaller than the sixth braking force BK_6, the vehicle driving assist apparatus 10 sets the sixth braking force BK_6 as the target braking force BKtgt. Then, the vehicle driving assist apparatus 10 controls the activations of the vehicle moving apparatus 20 so as to output the braking force which corresponds to the set target braking force BKtgt, from the braking apparatus 22.

As described above, the vehicle driving assist apparatus 10 executes the forcibly-braking process as the forcibly-decelerating process of applying the braking force BK greater than or equal to the predetermined driving force DRth (the sixth braking force BK_6) to the own vehicle 100 when (i) the light collision condition becomes satisfied, (ii) the dozing level LV at that time corresponds to the second level LV_2, and (iii) the vehicle moving speed V is within the sixth vehicle moving speed range R_6.

<Secondary Collision Reducing Control at Third Level>
<Third Level and Low Vehicle Moving Speed>

When (i) the light collision condition becomes satisfied, (ii) the dozing level LV at that time corresponds to the third level LV_3, and (iii) the vehicle moving speed V is within a seventh vehicle moving speed range R_7, or when (i) the vehicle driving assist apparatus 10 determines that the vehicle-dozing level LV corresponds to the third level LV_3 in response to the duration time T reaching the third time T_3, and (ii) the vehicle moving speed V is within the seventh vehicle moving speed range R_7, the vehicle driving assist apparatus 10 sets the target driving force DRtgt to zero, independently of the accelerator pedal operation amount AP, and controls the activations of the vehicle moving apparatus 20 so as not to output the driving force DR from the driving apparatus 21.

In other words, when (i) the light collision condition becomes satisfied, (ii) the dozing level LV at that time corresponds to the third level LV_3, and (iii) the vehicle moving speed V is within the seventh vehicle moving speed range R_7, the vehicle driving assist apparatus 10 executes the driving force limiting process as the forcibly-decelerating process of limiting the driving force DR applied to the own vehicle 100 to a value smaller than or equal to the predetermined driving force DRth (i.e., zero).

The seventh vehicle moving speed range R_7 is a range greater than the seventh vehicle moving speed V_7 (in this embodiment, zero) and smaller than or equal to an eighth vehicle moving speed V_8. The eighth vehicle moving speed V_8 is set to a value greater than the seventh vehicle moving speed V_7. In this embodiment, the seventh vehicle moving speed V_7 is set to the same value as the first vehicle moving speed V_1 and the fourth vehicle moving speed V_4. However, the seventh vehicle moving speed V_7 may be set to a value different from the first vehicle moving speed V_1 and the fourth vehicle moving speed V_4. In this embodiment, the eighth vehicle moving speed V_8 is set to the same value as the second vehicle moving speed V_2 and the fifth vehicle moving speed V_5. However, the eighth vehicle moving speed V_8 may be set to a value different from the second vehicle moving speed V_2 and the fifth vehicle moving speed V_5.

In addition, when (i) the light collision condition becomes satisfied, (ii) the dozing level LV at that time corresponds to the third level LV_3, and (iii) the vehicle moving speed V is within the seventh vehicle moving speed range R_7, the vehicle driving assist apparatus 10 determines whether the requested braking force BKreq is greater than or equal to a seventh braking force BK_7.

The seventh braking force BK_7 is set to a value greater than zero. In this embodiment, the seventh braking force BK_7 is set to the same value as the fifth braking force BK_5. However, the seventh braking force BK_7 may be set to a value different from the fifth braking force BK_5. In this embodiment, the seventh braking force BK_7 is set to a constant value, independently of the vehicle moving speed V. However, the seventh braking force BK_7 may be set to a value which increases as the vehicle moving speed V increases.

The vehicle driving assist apparatus 10 sets the requested braking force BKreq as the target braking force BKtgt when the requested braking force BKreq is greater than or equal to the seventh braking force BK_7. On the other hand, when the requested braking force BKreq is smaller than the seventh braking force BK_7, the vehicle driving assist apparatus 10 sets the seventh braking force BK_7 as the target braking force BKtgt. Then, the vehicle driving assist apparatus 10 controls the activations of the vehicle moving apparatus 20 so as to output the braking force which corresponds to the set target braking force BKtgt, from the braking apparatus 22.

As described above, the vehicle driving assist apparatus 10 executes the forcibly-braking process as the forcibly-decelerating process of applying the braking force BK greater than or equal to the predetermined driving force DRth (the seventh braking force BK_7) to the own vehicle 100 when (i) the light collision condition becomes satisfied, (ii) the dozing level LV at that time corresponds to the third level LV_3, and (iii) the vehicle moving speed V is within the seventh vehicle moving speed range R_7.

<Third Level and Middle Vehicle Moving Speed>

When (i) the light collision condition becomes satisfied, (ii) the dozing level LV at that time corresponds to the third level LV_3, and (iii) the vehicle moving speed V is within an eighth vehicle moving speed range R_8, the vehicle driving assist apparatus 10 sets the target driving force DRtgt to zero, independently of the accelerator pedal operation amount AP, and controls the activations of the vehicle moving apparatus 20 so as not to output the driving force DR from the driving apparatus 21.

In other words, when (i) the light collision condition becomes satisfied, (ii) the dozing level LV at that time corresponds to the third level LV_3, and (iii) the vehicle moving speed V is within the eighth vehicle moving speed range R_8, the vehicle driving assist apparatus 10 executes the driving force limiting process as the forcibly-decelerating process of limiting the driving force DR applied to the own vehicle 100 to a value smaller than or equal to the predetermined driving force DRth (i.e., zero).

The eighth vehicle moving speed range R_8 is a range greater than the eighth vehicle moving speed V_8 and smaller than or equal to a ninth vehicle moving speed V_9. The ninth vehicle moving speed V_9 is set to a value greater than the eighth vehicle moving speed V_8.

In addition, when (i) the light collision condition becomes satisfied, (ii) the dozing level LV at that time corresponds to the third level LV_3, and (iii) the vehicle moving speed V is within the eighth vehicle moving speed range R_8, the vehicle driving assist apparatus 10 determines whether the requested braking force BKreq is greater than or equal to an eighth braking force BK_8.

The eighth braking force BK_8 is set to a value greater than the seventh braking force BK_7. In this embodiment, the eighth braking force BK_8 is set to a constant value, independently of the vehicle moving speed V. However, the eighth braking force BK_8 may be set to a value which increases as the vehicle moving speed V increases.

The vehicle driving assist apparatus 10 sets the requested braking force BKreq as the target braking force BKtgt when the requested braking force BKreq is greater than or equal to the eighth braking force BK_8. On the other hand, when the requested braking force BKreq is smaller than the eighth braking force BK_8, the vehicle driving assist apparatus 10 sets the eighth braking force BK_8 as the target braking force BKtgt. Then, the vehicle driving assist apparatus 10 controls the activations of the vehicle moving apparatus 20 so as to output the braking force which corresponds to the set target braking force BKtgt, from the braking apparatus 22.

As described above, the vehicle driving assist apparatus 10 executes the forcibly-braking process as the forcibly-decelerating process of applying the braking force BK greater than or equal to the predetermined driving force DRth (the eighth braking force BK_8) to the own vehicle 100 when (i) the light collision condition becomes satisfied, (ii) the dozing level LV at that time corresponds to the third level LV_3, and (iii) the vehicle moving speed V is within the eighth vehicle moving speed range R_8.

<Third Level and High Vehicle Moving Speed>

When (i) the light collision condition becomes satisfied, (ii) the dozing level LV at that time corresponds to the third level LV_3, and (iii) the vehicle moving speed V is within a ninth vehicle moving speed range R_9, the vehicle driving assist apparatus 10 sets the target driving force DRtgt to zero, independently of the accelerator pedal operation amount AP, and controls the activations of the vehicle moving apparatus 20 so as not to output the driving force DR from the driving apparatus 21.

In other words, when (i) the light collision condition becomes satisfied, (ii) the dozing level LV at that time corresponds to the third level LV_3, and (iii) the vehicle moving speed V is within the ninth vehicle moving speed range R_9, the vehicle driving assist apparatus 10 executes the driving force limiting process as the forcibly-decelerating process of limiting the driving force DR applied to the own vehicle 100 to a value smaller than or equal to the predetermined driving force DRth (i.e., zero).

The ninth vehicle moving speed range R_9 is a range greater than the ninth vehicle moving speed V_9.

In addition, when (i) the light collision condition becomes satisfied, (ii) the dozing level LV at that time corresponds to the third level LV_3, and (iii) the vehicle moving speed V is within the ninth vehicle moving speed range R_9, the vehicle driving assist apparatus 10 determines whether the requested braking force BKreq is greater than or equal to a ninth braking force BK_9.

In this embodiment, the ninth braking force BK_9 is set to the same value as the eighth braking force BK_8. However, the ninth braking force BK_9 may be set to a value greater than the eighth braking force BK_8. Further, in this embodiment, the ninth braking force BK_9 is set to a constant value, independently of the vehicle moving speed V. However, the ninth braking force BK_9 may be set to a value which increases as the vehicle moving speed V increases.

The vehicle driving assist apparatus 10 sets the requested braking force BKreq as the target braking force BKtgt when the requested braking force BKreq is greater than or equal to the ninth braking force BK_9. On the other hand, when the requested braking force BKreq is smaller than the ninth braking force BK_9, the vehicle driving assist apparatus 10 sets the ninth braking force BK_9 as the target braking force BKtgt. Then, the vehicle driving assist apparatus 10 controls the activations of the vehicle moving apparatus 20 so as to output the braking force which corresponds to the set target braking force BKtgt, from the braking apparatus 22.

As described above, the vehicle driving assist apparatus 10 executes the forcibly-braking process as the forcibly-decelerating process of applying the braking force BK greater than or equal to the predetermined driving force DRth (the ninth braking force BK_9) to the own vehicle 100 when (i) the light collision condition becomes satisfied, (ii) the dozing level LV at that time corresponds to the third level LV_3, and (iii) the vehicle moving speed V is within the ninth vehicle moving speed range R_9.

As described above, the vehicle driving assist apparatus 10 is configured to execute the forcibly-decelerating process of decelerating the own vehicle 100 at the longitudinal deceleration Gd, depending on the dozing level LV at a time when (i) the light collision condition becomes satisfied, and (ii) the dozing condition becomes satisfied.

Further, the vehicle driving assist apparatus 10 terminates executing the secondary collision reducing control when the control terminating condition becomes satisfied while the vehicle driving assist apparatus 10 is executing the secondary collision reducing control. The control terminating condition becomes satisfied when the dozing level LV becomes lower than the predetermined threshold level LVth. In other words, the control terminating condition becomes satisfied when the duration time for which the vehicle driving assist apparatus 10 continues determining that the eyes of the driver of the own vehicle 100 are not closed, i.e., are open, reaches the predetermined time. Further, the control terminating condition becomes satisfied when the driver of the own vehicle 100 has operated the accelerator pedal 51 to accelerate the own vehicle 100 for the predetermined operation time or more. Furthermore, the control terminating condition becomes satisfied when the driver of the own vehicle 100 has operated the brake pedal 52 to decelerate the own vehicle 100 for the predetermined operation time or more. Furthermore, the control terminating condition becomes satisfied when the driver of the own vehicle 100 has operated the steering wheel 54 to steer the own vehicle 100 for the predetermined operation time or more. Furthermore, the control terminating condition becomes satisfied when the own vehicle 100 stops.

It should be noted that when the vehicle driving assist apparatus 10 determines that the control terminating condition becomes satisfied in response to the own vehicle 100 stopping and terminates executing the secondary collision reducing control, the vehicle driving assist apparatus 10 keeps applying the braking force BK to the own vehicle 100 or keeps the own vehicle 100 stopped by a parking brake (not shown) until a predetermined condition of permitting the own vehicle 100 to move.

Figure 4:
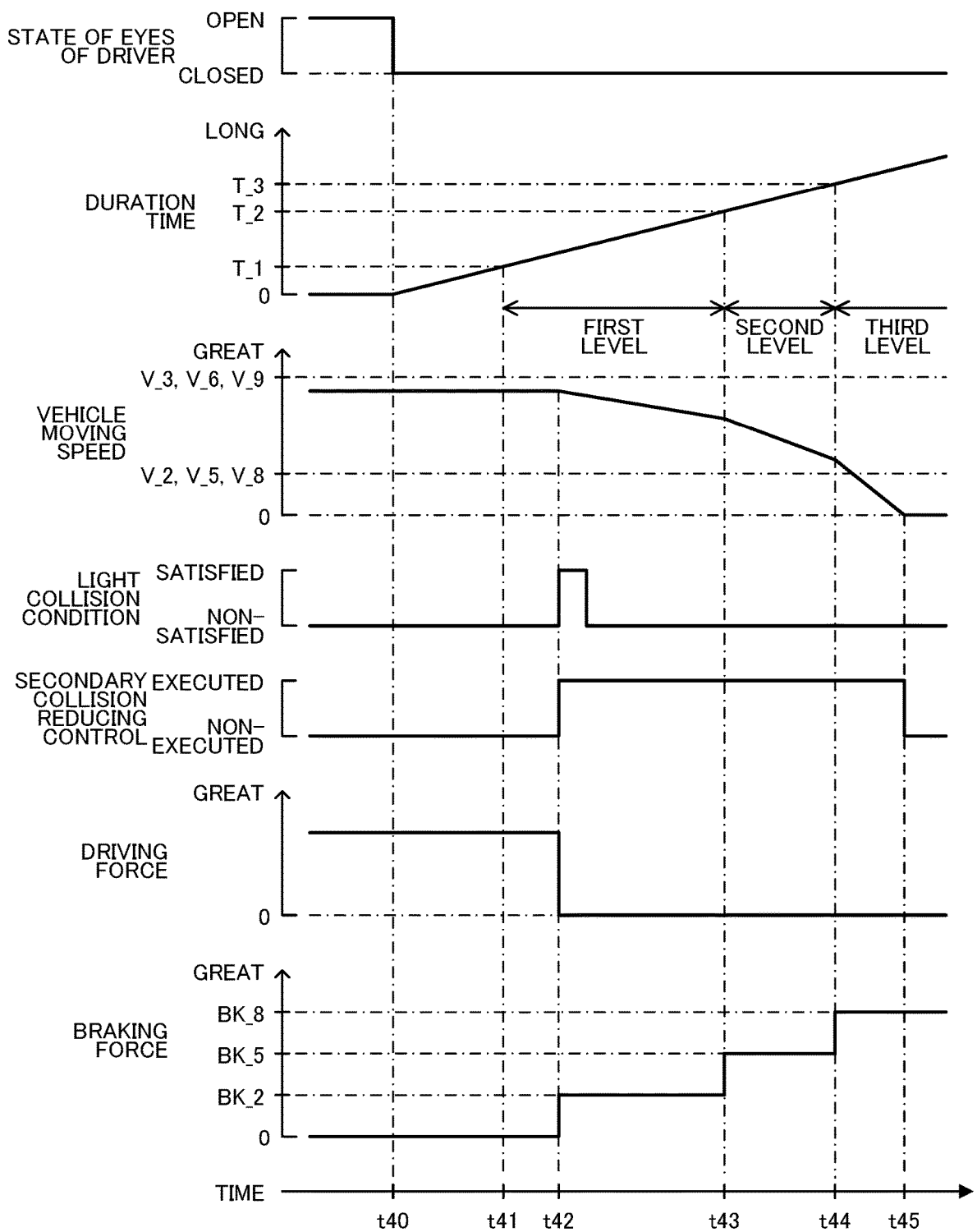
FIG. 4 is a view which shows a time chart of an example of changes of the driving force and the braking force when the secondary collision reducing control is executed.

When the secondary collision reducing control is executed by the vehicle driving assist apparatus 10, the driving force DR and the braking force BK applied to the own vehicle 100 are controlled, for example, as shown in FIG. 4.

In an example shown in FIG. 4, the eyes of the driver of the own vehicle 100 are determined to be closed at a time t40. Then, the duration time T is determined to reach the first time T_1, and the dozing level LV is determined to correspond to the first level LV_1 at a time t41. Then, the light collision condition is determined to become satisfied at a time t42. Then, the duration time T is determined to reach the second time T_2, and the dozing level LV is determined to correspond to the second level LV_2 at a time t43. Then, the duration time T is determined to reach the third time T_3, and the dozing level LV is determined to correspond to the third level LV_3 at a time t44.

In the example shown in FIG. 4, the light collision condition and the dozing condition become satisfied at the time t42. Thus, at the time t42, the secondary collision reducing control is started to be executed. At this time, the vehicle moving speed V is within the second vehicle moving speed range R_2. Thus, the driving force DR applied to the own vehicle 100 is controlled to zero by the driving force limiting process, and the braking force BK applied to the own vehicle 100 is controlled to the second braking force BK_2 by the forcibly-braking process. Thereby, the vehicle moving speed V decreases.

When the dozing level LV is determined to correspond to the second level LV_2 at the step t43, the vehicle moving speed V is within the fifth vehicle moving speed range R_5. Thus, the driving force DR applied to the own vehicle 100 is controlled to zero by the driving force limiting process, and the braking force BK applied to the own vehicle 100 is controlled to the fifth braking force BK_5 greater than the second braking force BK_2 by the forcibly-braking process. Thereby, the vehicle moving speed V further decreases.

When the dozing level LV is determined to correspond to the third level LV_3 at the step t44, the vehicle moving speed V is within the eighth vehicle moving speed range R_8. Thus, the driving force DR applied to the own vehicle 100 is controlled to zero by the driving force limiting process, and the braking force BK applied to the own vehicle 100 is controlled to the eighth braking force BK_8 greater than the fifth braking force BK_5 by the forcibly-braking process. Thereby, the vehicle moving speed V further decreases.

The vehicle moving speed V becomes zero at the time t45. Thus, executing the secondary collision reducing control is terminated.

<Effects>

Just after the own vehicle has the light collision due to the dozing driver of the own vehicle, the own vehicle may have another collision (the secondary collision). One of measures for avoiding the secondary collision is to execute the forcibly-decelerating process of forcibly decelerating and stopping the own vehicle when the own vehicle has the light collision due to the dozing driver of the own vehicle. In this regard, the driver is dozing, but can awake and take an action for avoiding the secondary collision when the light collision occurs. In this case, if the own vehicle is decelerated by the forcibly decelerating process, a situation that the vehicle is decelerated too much for the driver, may arise.

One of measures for avoiding such a situation is to execute the forcibly-decelerating process only when the driver is dozing to an extent that the driver cannot awake even when the light collision arises, in other words, only when it can be considered that the driver is dozing with certainty. One of measure for determining that the driver is dozing with certainty is to determine that the driver is dozing with certainty when a condition that the driver is determined to be dozing continues for a certain time.

However, with this measure, the forcibly-decelerating process is not started to be executed until it is determined that the driver is dozing with certainty. As a result, the secondary collision may not be avoided.

As described above, if the forcibly-decelerating process is executed only when the driver is dozing with certainty, the secondary collision may not be avoided. However, if the forcibly-decelerating process is executed also when the driver is dozing with low certainty, the own vehicle may be unnecessarily decelerated.

The vehicle driving assist apparatus 10 starts to execute the forcibly-decelerating process when the dozing level LV of the driver of the own vehicle 100 is low and then increases the deceleration of the own vehicle 100 realized by the forcibly-decelerating process when the dozing level LV of the driver becomes high. Thus, the vehicle driving assist apparatus 10 can ensure that the secondary collision is avoided with avoiding the unnecessary deceleration of the own vehicle 100.

As described above, the vehicle driving assist apparatus 10 determines whether to execute the driving force limiting process as the forcibly-decelerating process, depending on the vehicle moving speed V and whether to execute the forcibly-braking process, depending on the vehicle moving speed V when the dozing level LV corresponds to the first level LV_1. In this regard, the vehicle driving assist apparatus 10 may be configured to execute the driving force limiting process, independently of the vehicle moving speed V when the dozing level LV corresponds to the first level LV_1, and execute the forcibly-braking process, independently of the vehicle moving speed V when the dozing level LV corresponds to the second level LV_2 or the third level LV_3. In other words, the vehicle driving assist apparatus 10 may be configured to execute the driving force limiting process as the forcibly-decelerating process, independently of the vehicle moving speed V when the dozing level LV is lower than a predetermined switching level LV_sw, and execute the forcibly-braking process as the forcibly-decelerating process, independently of the vehicle moving speed V when the dozing level LV is greater than or equal to the predetermined switching level LV_sw.

Further, the vehicle driving assist apparatus 10 determines whether to execute the driving force limiting process as the forcibly-decelerating process, depending on the dozing level LV and whether to execute the forcibly-braking process as the forcibly-decelerating process, depending on the dozing level when the vehicle moving speed V is relatively low (i.e. the vehicle moving speed V is within the first vehicle moving speed range R_1, or the fourth vehicle moving speed range R_4, or the seventh vehicle moving speed range R_7). In this regard, the vehicle driving assist apparatus 10 may be configured to execute the driving force limiting process as the forcibly-decelerating process, independently of the dozing level LV when the vehicle moving speed V is relatively low and execute the forcibly-braking process as the forcibly-decelerating process, independently of the dozing level LV when the vehicle moving speed V is relatively high.

Furthermore, the vehicle driving assist apparatus 10 determines the predetermined driving force DRth for the driving force limiting process, depending on the vehicle moving speed V and the predetermined braking force BKth for the forcibly-braking process, depending on the vehicle moving speed V when the dozing level LV is the same level. In this regard, the vehicle driving assist apparatus 10 may be configured to set the predetermined driving force DRth to a constant value and the predetermined braking force BKth to a constant value, dependently of the vehicle moving speed V when the dozing level LV is the same level as far as (i) the predetermined driving force DRth set when the dozing level LV is high, is smaller than the predetermined driving force DRth set when the dozing level LV is low, and (ii) the predetermined braking force BKth set when the dozing level LV is high, is greater than the predetermined braking force BKth set when the dozing level LV is low.

The dozing level LV used by the vehicle driving assist apparatus 10 is divided into three levels, i.e., the first level LV_1, the second level LV_2, and the third level LV_3. In this regard, the dozing level LV may be divided into two levels or four or more levels. In other words, the dozing level LV may be divided into two or more levels.

The vehicle driving assist apparatus 10 executes the forcibly-decelerating process with controlling the longitudinal deceleration Gd of the own vehicle 100 such that the longitudinal deceleration Gd realized when the dozing level LV is the second level LV_2 is, greater than the longitudinal deceleration Gd realized when the dozing level LV is the first level LV_1 and executes the forcibly-decelerating process with controlling the longitudinal deceleration Gd of the own vehicle 100 such that the longitudinal deceleration Gd realized when the dozing level LV is the third level LV_3, is greater than the longitudinal deceleration Gd realized when the dozing level LV is the second level LV_2. In this regard, the vehicle driving assist apparatus 10 may be configured to execute the forcibly-braking process with controlling the longitudinal deceleration Gd of the own vehicle 100 such that the longitudinal deceleration Gd realized when the dozing level LV is high, is greater than the longitudinal deceleration Gd realized when the dozing level LV is low.

<Specific Operations of Vehicle Driving Assist Apparatus>

Figure 5:
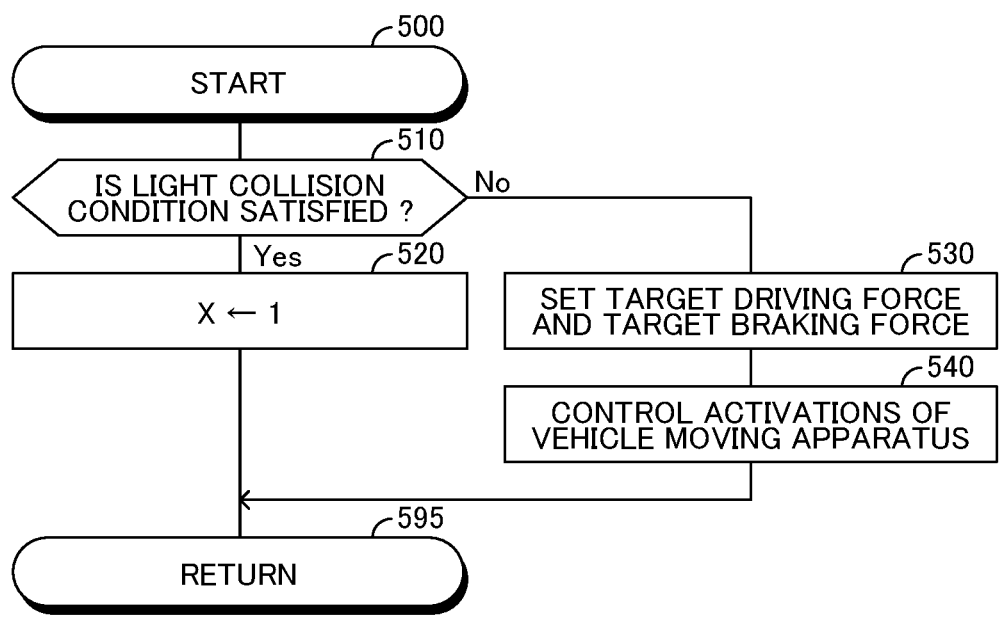
FIG. 5 is a view which shows a flowchart of a routine executed by the vehicle driving assist apparatus according to the embodiment of the invention.

Next, specific operations of the vehicle driving assist apparatus 10 will be described. The CPU of the ECU 90 of the vehicle driving assist apparatus 10 is configured or programmed to execute a routine shown in FIG. 5 each time a predetermined calculation time elapses. Thus, at a predetermined timing, the CPU starts to execute a process from a step 500 of the routine shown in FIG. 5 and proceeds with the process to a step 510 to determine whether the light collision condition is satisfied.

When the CPU determines "Yes" at the step 510, the CPU proceeds with the process to a step 520 to set a value of a light collision flag X to "1". Next, the CPU proceeds with the process to a step 595 to terminate executing this routine once.

On the other hand, when the CPU determines "No" at the step 510, the CPU proceeds with the process to a step 530 to set the requested driving force DRreq acquired, based on the accelerator pedal operation amount AP as the target driving force DRtgt or set the requested braking force BKreq acquired, based on the brake pedal operation amount BP as the target braking force BKtgt. Next, the CPU proceeds with the process to a step 540 to control the activations of the driving apparatus 21 so as to output the driving force which corresponds to the target driving force DRtgt set at the step 530 or the activations of the braking apparatus 22 so as to output the braking force which corresponds to the target braking force BKtgt set at the step 530. Next, the CPU proceeds with the process to the step 595 to terminate executing this routine once.

Figure 6:
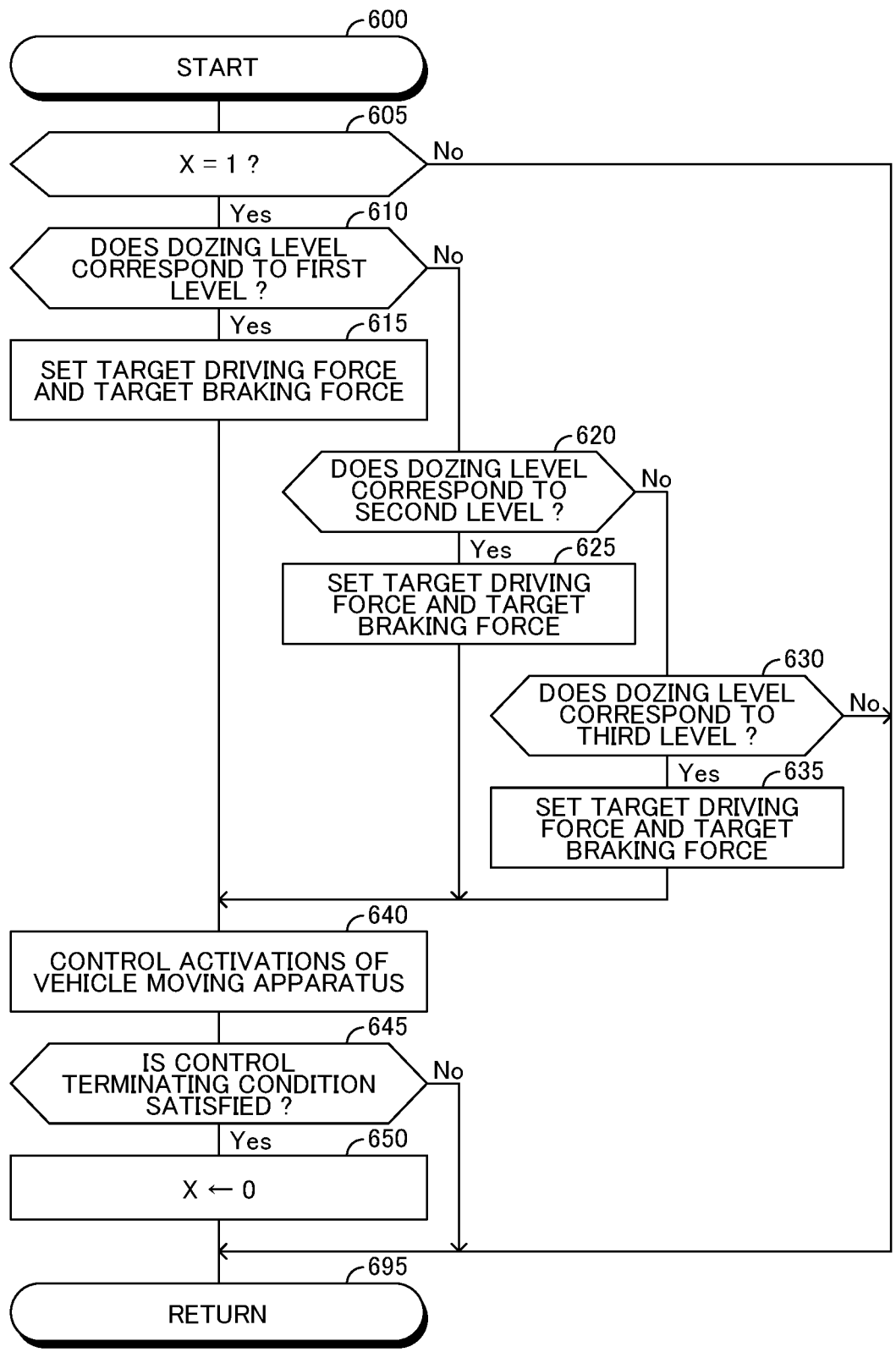
FIG. 6 is a view which shows a flowchart of a routine executed by the vehicle driving assist apparatus according to the embodiment of the invention.

Further, the CPU is configured or programmed to execute a routine shown in FIG. 6 each time the predetermined calculation time elapses. Thus, at a predetermined timing, the CPU starts to execute a process from a step 600 of the routine shown in FIG. 6 and proceeds with the process to a step 605 to determine whether the value of the light collision flag X is "1".

When the CPU determines "Yes" at the step 605, the CPU proceeds with the process to a step 610 to determine whether the dozing level LV corresponds to the first level LV_1.

When the CPU determines "Yes" at the step 610, the CPU proceeds with the process to a step 615 to set the target driving force DRtgt or the target braking force BKtgt, depending on the vehicle moving speed V as described above. Next, the CPU proceeds with the process to a step 640 to control the activations of the vehicle moving apparatus 20 so as to output the driving force which corresponds to the target driving force DRtgt set at the step 615 from the driving apparatus 21 or output the braking force which corresponds to the target braking force BKtgt set at the step 615 from the braking apparatus 22. Next, the CPU proceeds with the process to a step 645.

On the other hand, when the CPU determines "No" at the step 610, the CPU proceeds with the process to a step 620 to determine whether the dozing level LV corresponds to the second level LV_2.

When the CPU determines "Yes" at the step 620, the CPU proceeds with the process to a step 625 to set the target driving force DRtgt and the target braking force BKtgt, depending on the vehicle moving speed V as described above. It should be noted that at the step 625, the target driving force DRtgt is set to zero. Next, the CPU proceeds with the process to the step 640 to control the activations of the vehicle moving apparatus 20 so as not to output the driving force from the driving apparatus 21 and so as to output the braking force which corresponds to the target braking force BKtgt, from the braking apparatus 22. Next, the CPU proceeds with the process to the step 645.

When the CPU determines "Yes" at the step 630, the CPU proceeds with the process to a step 635 to set the target driving force DRtgt and the target braking force BKtgt, depending on the vehicle moving speed V as described above. It should be noted that at the step 625, the target driving force DRtgt is set to zero. Next, the CPU proceeds with the process to the step 640 to control the activations of the vehicle moving apparatus 20 so as not to output the driving force from the driving apparatus 21 and so as to output the braking force which corresponds to the target braking force BKtgt, from the braking apparatus 22. Next, the CPU proceeds with the process to the step 645.

On the other hand, when the CPU determines "No" at the step 630, the CPU proceeds with the process directly to the step 695 to terminate executing this routine once.

When the CPU proceeds with the process to the step 645, the CPU determines whether the control terminating condition is satisfied.

When the CPU determines "Yes" at the step 645, the CPU sets the value of the light collision flag X to "h". Next, the CPU proceeds with the process to the step 695 to terminate executing this routine once.

On the other hand, when the CPU determines "No" at the step 645, the CPU proceeds with the process directly to the step 695 to terminate executing this routine once.

Figure 7:
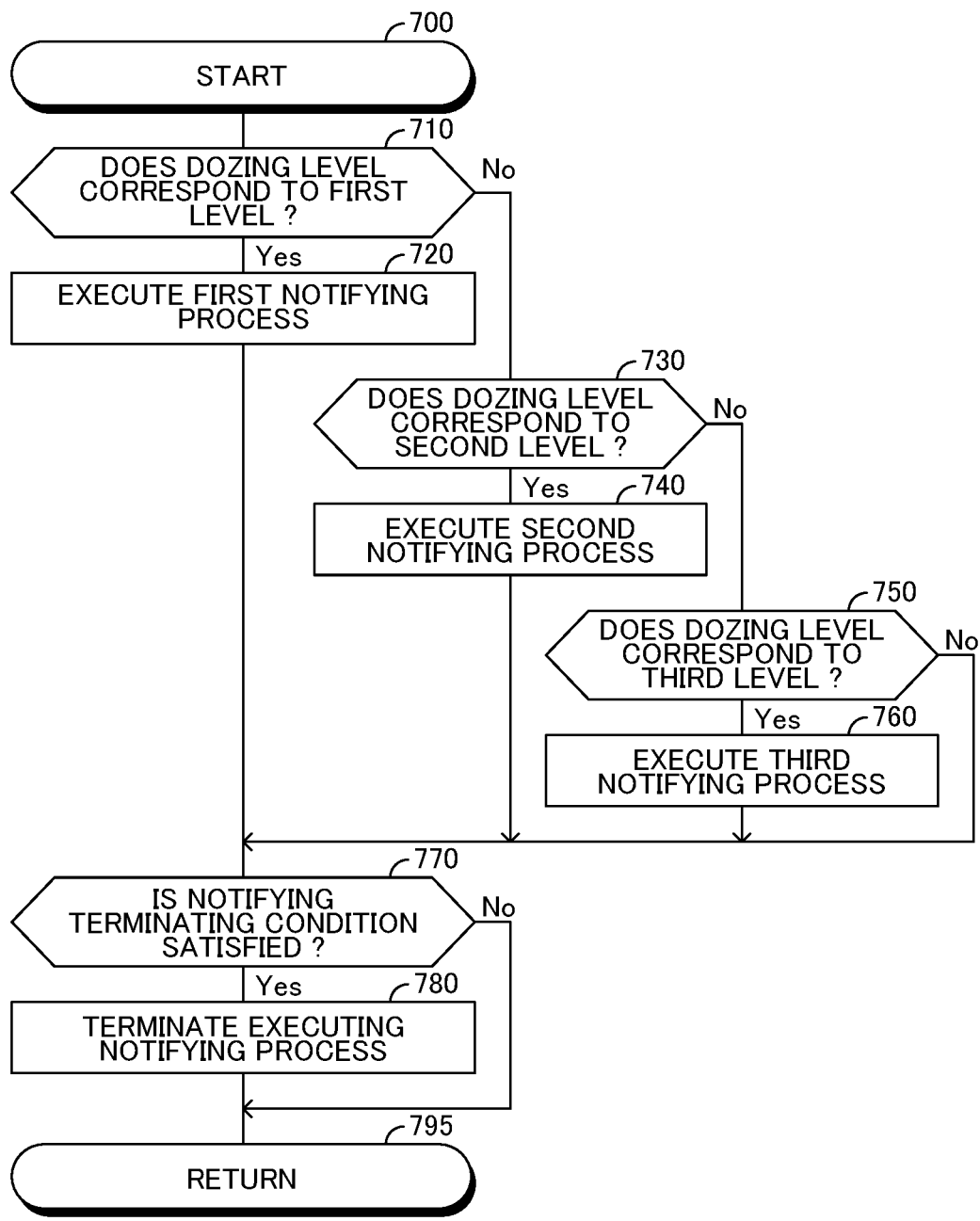
FIG. 7 is a view which shows a flowchart of a routine executed by the vehicle driving assist apparatus according to the embodiment of the invention.

Furthermore, the CPU is configured or programmed to execute a routine shown in FIG. 7 each time the predetermined calculation time elapses. Thus, at a predetermined timing, the CPU starts to execute a process from a step 700 of the routine shown in FIG. 7 and proceeds with the process to a step 710 to determine whether the dozing level LV corresponds to the first level LV_1.

When the CPU determines "Yes" at the step 710, the CPU proceeds with the process to a step 720 to execute the first notifying process described above. Next, the CPU proceeds with the process to a step 770.

On the other hand, when the CPU determines "No" at the step 710, the CPU proceeds with the process to a step 730 to determine whether the dozing level LV corresponds to the second level LV_2.

When the CPU determines "Yes" at the step 730, the CPU proceeds with the process to a step 740 to execute the second notifying process described above. Next, the CPU proceeds with the process to the step 770.

On the other hand, when the CPU determines "No" at the step 730, the CPU proceeds with the process to a step 750 to determine whether the dozing level LV corresponds to the third level LV_3.

When the CPU determines "Yes" at the step 730, the CPU proceeds with the process to a step 760 to execute the third notifying process described above. Next, the CPU proceeds with the process to the step 770.

On the other hand, when the CPU determines "No" at the step 750, the CPU proceeds with the process directly to the step 770.

When the CPU proceeds with the process to the step 770, the CPU determines whether the notifying terminating condition is satisfied.

When the CPU determines "Yes" at the step 770, the CPU proceeds with the process to a step 780 to terminate executing the notifying process. Next, the CPU proceeds with the process to a step 795 to terminate executing this routine once.

On the other hand, when the CPU determines "No" at the step 770, the CPU proceeds with the process directly to the step 795 to terminate executing this routine once.

The specific operations of the vehicle driving assist apparatus 10 has been described.

It should be noted that the invention is not limited to the aforementioned embodiments, and various modifications can be employed within the scope of the invention.

What is claimed is:

1. A vehicle driving assist apparatus, comprising an electronic control unit which is configured to:
    acquire (i) a collision index value which represents a magnitude of a collision of an own vehicle and (ii) a dozing level of a driver of the own vehicle; and
    execute a secondary collision reducing control of executing a forcibly-decelerating process of forcibly decelerating the own vehicle when (i) a light collision condition that a light collision that the collision index value is within a predetermined light collision range occurs, is satisfied, and (ii) a dozing condition that the dozing level is higher than or equal to a predetermined threshold level, is satisfied,
    wherein the electronic control unit is configured to execute the forcibly-decelerating process so as to decelerate the own vehicle with controlling a deceleration of the own vehicle such that the deceleration of the vehicle realized when (i) the light collision condition and the dozing condition become satisfied, and (ii) the dozing level is relatively low, is smaller than the deceleration of the own vehicle realized when the deceleration when (i) the light collision condition and the dozing condition become satisfied, and (ii) the dozing level is relatively high;
    wherein the electronic control unit is configured to execute the forcibly-decelerating process by a forcibly-braking process of applying a braking force greater than or equal to a predetermined braking force to the own vehicle or by a driving force limiting process of limiting a driving force applied to the own vehicle to a value smaller than or equal to a predetermined driving force; and
    wherein the electronic control unit is configured to:
    execute the forcibly-decelerating process by the forcibly-braking process when (i) the light collision condition and the dozing condition become satisfied, and (ii) the dozing level is higher than or equal to a predetermined switching level which is higher than the predetermined threshold level; and
    execute the forcibly-decelerating process by the driving force limiting process when (i) the light collision condition and the dozing condition become satisfied, and (ii) the dozing level is lower than the predetermined switching level.

2. The vehicle driving assist apparatus as set forth in claim 1, wherein the electronic control unit is configured to:
    execute the forcibly-decelerating process by the forcibly-braking process when (i) the light collision condition and the dozing condition become satisfied, and (ii) a vehicle moving speed of the own vehicle is higher than or equal to a predetermined vehicle moving speed; and
    execute the forcibly-decelerating process by the driving force limiting process when (i) the light collision condition and the dozing condition become satisfied, and (ii) the vehicle moving speed of the own vehicle is lower than the predetermined vehicle moving speed.

3. The vehicle driving assist apparatus as set forth in claim 1, wherein the electronic control unit is configured to:
    set a predetermined braking force such that the predetermined braking force set when (i) the electronic control unit executes the forcibly-decelerating process by the forcibly-braking process of applying the braking force greater than or equal to the predetermined braking force to the own vehicle in response to the light collision condition and the dozing condition becoming satisfied, and (ii) the dozing level is relatively high, is greater than the predetermined braking force set when (i) the electronic control unit executes the forcibly-decelerating process by the forcibly-braking process of applying the braking force greater than or equal to the predetermined braking force to the own vehicle in response to the light collision condition and the dozing condition becoming satisfied, and (ii) the dozing level is relatively low; and
    set a predetermined driving force such that the predetermined driving force set when (i) the electronic control unit executes the forcibly-decelerating process by the driving force limiting process of limiting the driving force applied to the own vehicle to a value smaller than or equal to the predetermined driving force in response to the light collision condition and the dozing condition becoming satisfied, and (ii) the dozing level is relatively high, is smaller than the predetermined driving force set when (i) the electronic control unit executes the forcibly-decelerating process by the driving force limiting process of applying the driving force applied to the own vehicle to a value smaller than or equal to the predetermined driving force in response to the light collision condition and the dozing condition becoming satisfied, and (ii) the dozing level is relatively low.

4. The vehicle driving assist apparatus as set forth in claim 1, wherein the electronic control unit is configured to:
    set a predetermined braking force such that the predetermined braking force set when (i) the electronic control unit executes the forcibly-decelerating process by the forcibly-braking process of applying the braking force greater than or equal to the predetermined braking force to the own vehicle in response to the light collision condition and the dozing condition becoming satisfied, and (ii) a vehicle moving speed of the own vehicle is relatively high, is greater than the predetermined braking force set when (i) the electronic control unit executes the forcibly-decelerating process by the forcibly-braking process of applying the braking force greater than or equal to the predetermined braking force to the own vehicle in response to the light collision condition and the dozing condition becoming satisfied, and (ii) the vehicle moving speed of the own vehicle is relatively low; and set a predetermined driving force such that the predetermined driving force set when (i) the electronic control unit executes the forcibly-decelerating process by the driving force limiting process of limiting the driving force applied to the own vehicle to a value smaller than or equal to the predetermined driving force in response to the light collision condition and the dozing condition becoming satisfied, and (ii) the vehicle moving speed of the own vehicle is relatively high, is smaller than the predetermined driving force set when (i) the electronic control unit executes the forcibly-decelerating process by the driving force limiting process of applying the driving force applied to the own vehicle to a value smaller than or equal to the predetermined driving force in response to the light collision condition and the dozing condition becoming satisfied, and (ii) the vehicle moving speed of the own vehicle is relatively low.

5. The vehicle driving assist apparatus as set forth in claim 1, wherein the electronic control unit is configured to:

acquire a duration time which the electronic control unit has determined that eyes of the driver of the own vehicle are closed; and determine that the dozing level when the duration time is relatively long, is higher than the dozing level when the duration time is relatively short.

6. The vehicle driving assist apparatus as set forth in claim 1, wherein the predetermined light collision range is set to a range smaller than the collision index value at which an airbag of the own vehicle is developed.

7. The vehicle driving assist apparatus as set forth in claim 1, wherein:

the electronic control unit is configured to terminate executing the secondary collision reducing control when a control terminating condition becomes satisfied after the light collision condition and the dozing condition become satisfied; and the control terminating condition is satisfied when the dozing level becomes lower than the predetermined threshold level, or when the driver of the own vehicle has made an operation to accelerate or decelerate or steer the own vehicle for a predetermined operating time or more, or when the own vehicle stops.

\* \* \* \* \*